United States Patent [19]

Zweigart et al.

[11] Patent Number: 4,842,328
[45] Date of Patent: Jun. 27, 1989

[54] RETAINING RAIL FOR THE END-WISE FIXING OF THE INNER ROOF COVERING

[75] Inventors: Gerhard Zweigart, Aidlingen; Werner Belke; Ewald Günther, both of Böblingen; Walter Gantzhorn, Grafenau, all of Fed. Rep. of Germany

[73] Assignee: Daimler-Benz Aktieqesellschaft, Stuttgart, Fed. Rep. of Germany

[21] Appl. No.: 86,806

[22] Filed: Aug. 19, 1987

[30] Foreign Application Priority Data

Aug. 19, 1986 [DE] Fed. Rep. of Germany ....... 3628109

[51] Int. Cl.$^4$ ............................................. B62D 25/06
[52] U.S. Cl. .................................................... 296/214
[58] Field of Search .................... 296/214; 52/222, 718

[56] References Cited

U.S. PATENT DOCUMENTS

| 3,433,526 | 3/1969 | Field et al. | 296/137 |
| 4,099,767 | 7/1978 | Kania | 296/214 |
| 4,406,494 | 9/1983 | Uemura | 296/214 |
| 4,516,804 | 5/1985 | Yamamaki | 296/214 |

FOREIGN PATENT DOCUMENTS

| 2936848 | 4/1981 | Fed. Rep. of Germany . |
| 32844 | 10/1964 | German Democratic Rep. . |
| 85762 | 5/1983 | Japan . |

Primary Examiner—Robert R. Song
Attorney, Agent, or Firm—Barnes & Thornburg

[57] ABSTRACT

For obtaining a permanent decorative high-grade fixing of the inner roof covering in a motor vehicle, an approximately U-shaped retaining rail is used whose two legs terminate each in a lip, of which one is bent under interposition of a film hinge—receiving the ceiling material by welding operation—within the area of the film hinge in the direction of a flange-receiving opening extending between the two legs. The flange-receiving opening serves during the fastening of the thus-preassembled roof covering for being mounted over a roof-side flange.

2 Claims, 1 Drawing Sheet

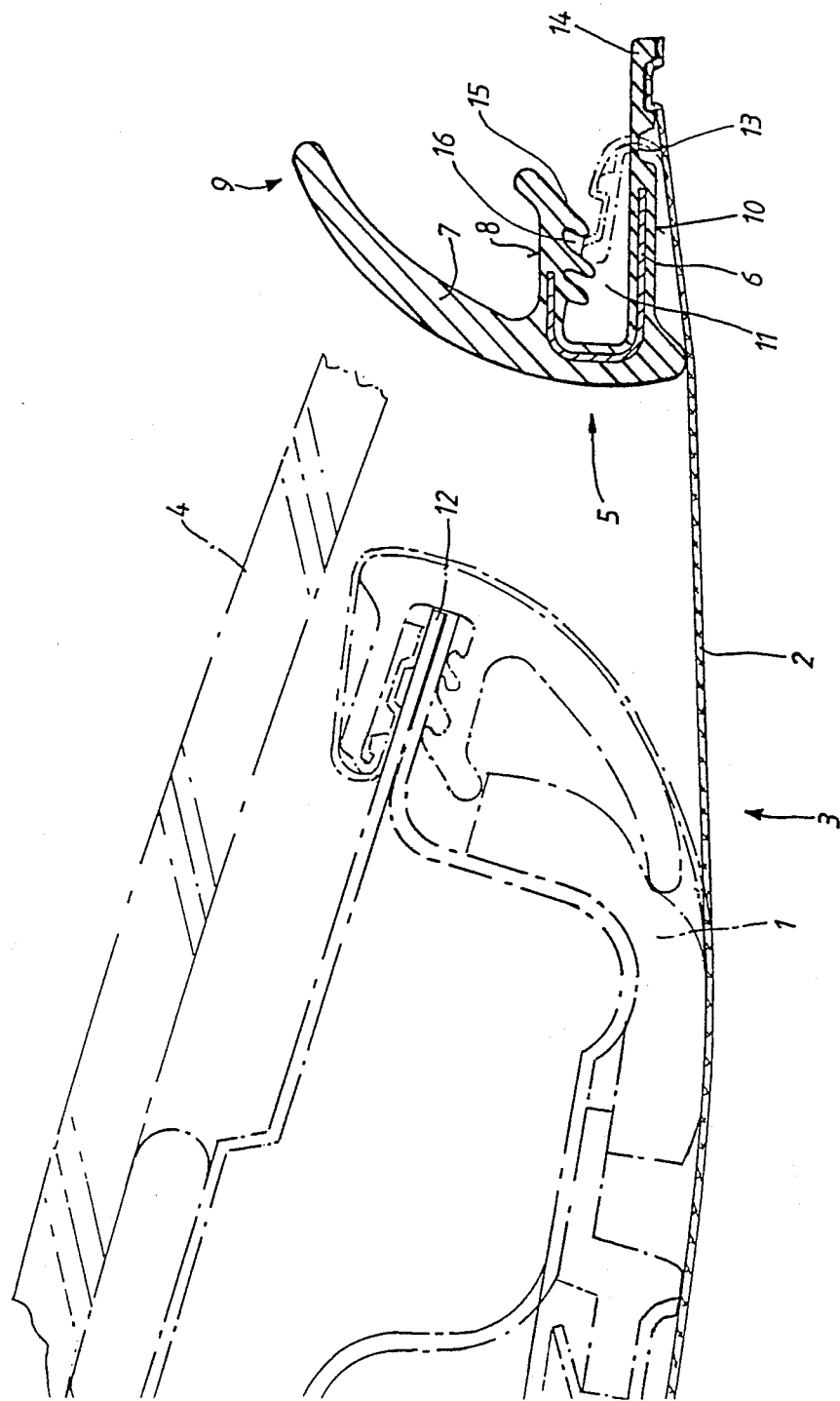

RETAINING RAIL FOR THE END-WISE FIXING OF THE INNER ROOF COVERING

BACKGROUND AND SUMMARY OF THE INVENTION

The present invention relates to a retaining rail for the end-wise fastening of the inner roof covering or headliner in a motor vehicle, consisting of a U-shaped strip adapted to be slipped over a roof-side flange with a first lip protruding from one leg thereof and supported, covered by the ceiling material, at the padding of the roof covering, and with a second lip also covered by the ceiling material and fixing the same.

Such a fastening arrangement for the ceiling material or headliner in which both lips protrude from the same leg of the strip and the ceiling material is fixed by clamping action, is disclosed in the U.S. Pat. No. 3,433,526. It is disadvantageous that the clamping action may be lessened, for example, by local stressing of the ceiling material or by heat influence and folds may form which must be eliminated by a relatively costly after-stretching operation. As the retaining rail is located in close proximity to windowpanes and door cut-outs, the clamping place can be seen and reduces the overall appearance of the vehicle.

It is therefore the object of the present invention to so construct the retaining rail that even in case of local over-stressing of the ceiling material or headliner, the connection between the latter and the retaining rail does not suffer. Furthermore, a pre-assembly is to be attained in conjunction with a simultaneous improvement of the appearance within the connecting area so that the fastening operation, properly speaking, becomes quite simple.

The underlying problems are solved according to the present invention in that the lip is formed at the leg of the strip opposite the ceiling distention and is operatively connected with the same by way of a film hinge, in that the ceiling material is welded onto the lip and in that the latter together with the ceiling material is bent off within the area of the film hinge and is displaced into the flange-receiving opening.

According to a further advantageous feature of the present invention, the one leg includes an inclined butting surface extending rising toward the flange-receiving opening with a detent recess adjoining the same, at which the lip which is guided around, the same is supported by way of the ceiling material in the pre-assembled condition.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention and wherein:

The single FIGURE is a cross-sectional view through an arrangement in accordance with the present invention, illustrating the assembled condition in dash-and-dotted lines.

DETAILED DESCRIPTION OF THE DRAWING

Referring now to the single FIGURE of the drawing, a retaining rail generally designated by reference numeral 5 is provided for fixing the inner roof covering generally designated by reference numeral 3 and provided with a padding 1 and with a ceiling material or headliner 2 in a passenger motor vehicle, of which only the upper area of the adhesively fastened rear window 4 is shown; the retaining rail 5 essentially consists of a U-shaped strip 7 provided with a reinforcement 6. The U-shaped strip 7 includes a first leg 8 with a lip 9 which in the installed condition of the strip 7—as indicated in dash-and-dotted lines—abuts with prestress at the padding 1. Another leg 10 is located opposite the leg 8 and a flange-receiving means 11 in the form of an opening extends between the two legs 8 and 10, by way of which the retaining rail 5 is clampingly connected with a roof-side flange 12.

The leg 10 includes adjoining the reinforcement 6 which consists of metal, a film hinge 13 and terminates in a lip 14. The ceiling material 2 is permanently connected with the lip 14 within the area of the latter by a welding operation and subsequently the lip 14, together with the ceiling material 2 secured thereat is bent within the area of the film hinge 13—as indicated in dash-and-dotted lines—and, is moved into the flange-receiving means 11. As the leg 8 is provided at its free end with an inclined abutment and guide surface 15 extending rising toward the flange-receiving means 11, which is adjoined by a detent recess 16, during the aforementioned bending operation the lip 14 runs up along the inclined surface 15 and then engages in the detent recess 16 whereby the pre-assembly operation is terminated.

For fastening the roof covering 3, the retaining rail 5 is rolled in toward the vehicle center whereby the lip 9 is covered by the decorative ceiling material 2, and subsequently the flange-receiving means 11 is pressed over the flange 12 so that the fastening position indicated in dash-and-dotted lines will result.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A retaining rail for the end-wise fastening of an inner roof covering means in a motor vehicle, comprising a U-shaped strip means adapted to be slipped over a roof-side flange means, said strip means including lip means covered by the ceiling material, said lip means being constructed as foldable extension of a U-shaped leg and together with the ceiling material being pivoted in the direction toward a flange-receiving means, the lip means being formed at the leg of the strip means opposite the distention of the ceiling material and being operatively connected with the same by way of a film hinge, the ceiling material being welded to the lip means, and the lip means together with the ceiling material being bent within the area of the film hinge and being moved into the flange-receiving means.

2. A holding rail according to claim 1, wherein the leg facing the covering means includes an inclined abutment surface. extending rising toward the flange-receiving means with a detent recess adjoining the same, and the lip means which is guided around, being supported in the detent recess by way of the ceiling material in the pre-assembled condition.

* * * * *